United States Patent
Sonawalla et al.

(10) Patent No.: US 12,355,733 B2
(45) Date of Patent: Jul. 8, 2025

(54) CONNECTING WEB PUBLISHER INVENTORY TO PROGRAMMATIC EXCHANGES WITHOUT THIRD-PARTY COOKIES

(71) Applicant: LiveRamp, Inc., San Francisco, CA (US)

(72) Inventors: Azim Sonawalla, New York, NY (US); Ian Meyers, Berkeley, CA (US); Andrew K. Day, San Francisco, CA (US)

(73) Assignee: LiveRamp, Inc., San Francisco, CA (US)

( * ) Notice: Subject to any disclaimer, the term of this patent is extended or adjusted under 35 U.S.C. 154(b) by 291 days.

(21) Appl. No.: 17/638,841

(22) PCT Filed: Jun. 9, 2020

(86) PCT No.: PCT/US2020/036836
§ 371 (c)(1),
(2) Date: Feb. 27, 2022

(87) PCT Pub. No.: WO2021/040833
PCT Pub. Date: Mar. 4, 2021

(65) Prior Publication Data
US 2022/0337562 A1 Oct. 20, 2022

Related U.S. Application Data

(60) Provisional application No. 62/894,349, filed on Aug. 30, 2019.

(51) Int. Cl.
*H04L 9/40* (2022.01)
*G06F 21/62* (2013.01)

(52) U.S. Cl.
CPC ...... *H04L 63/0428* (2013.01); *G06F 21/6263* (2013.01)

(58) Field of Classification Search
CPC .................. H04L 63/0428; G06F 21/6263
See application file for complete search history.

(56) References Cited

U.S. PATENT DOCUMENTS 9,595,051 B2   3/2017  Stack et al.
9,818,131 B2   11/2017 Yonebayashi et al.
(Continued)

OTHER PUBLICATIONS

Extended European search report for application No. 20855860.1 (Aug. 22, 2023).

(Continued)

*Primary Examiner* — Nicholas P Celani

(57) ABSTRACT

A system for serving targeted advertisements while protecting privacy receives an item of personally identifiable information (PII) from a person using a browser. The item of PII may be, for example, a telephone number or email address. The item of PII is hashed, then used to look up a node in an identity graph corresponding to the person. The node contains a link uniquely associated with the person, which is returned in an encrypted form. An envelope is created that contains the link, and is set as a first-party cookie on the person's browser. When the person uses the browser to visit another website the envelope is decrypted, and the link is separately encrypted using a different method for each of a plurality of DSPs to which the link is sent. The DSPs are used to set a display advertisement on the user's browser, the process occurring in real time.

29 Claims, 2 Drawing Sheets

(56) References Cited

U.S. PATENT DOCUMENTS

| | | |
|---|---|---|
| 9,917,691 B2 | 3/2018 | Roullier et al. |
| 10,055,747 B1 | 8/2018 | Sherman et al. |
| 10,181,136 B2 | 1/2019 | Randazzo et al. |
| 2008/0091535 A1 | 4/2008 | Heiser et al. |
| 2013/0124329 A1 | 5/2013 | Tengler |
| 2014/0120864 A1 | 5/2014 | Manolarakis et al. |
| 2014/0278953 A1 | 9/2014 | Ismail et al. |
| 2014/0279044 A1 | 9/2014 | Summers et al. |
| 2015/0262199 A1 | 9/2015 | Taylor et al. |
| 2016/0142379 A1 | 5/2016 | Tawakol et al. |
| 2017/0201496 A1* | 7/2017 | Luff ................ H04L 9/14 |
| 2017/0257358 A1 | 9/2017 | Ebrahimi et al. |
| 2018/0212931 A1* | 7/2018 | Zhou .............. G06Q 30/0609 |
| 2018/0376220 A1 | 12/2018 | Ray et al. |
| 2019/0057420 A1* | 2/2019 | Wang .............. G06F 21/62 |
| 2020/0076882 A1* | 3/2020 | Parekh ............ H04L 67/02 |
| 2020/0184084 A1* | 6/2020 | Shockley ......... H04L 9/0819 |

OTHER PUBLICATIONS

Levine, Barry, "Experian Launches Pll-Matching Audience Targeting Platform to Reach 85% of the US," https://martechtoday.com/experian-launches-pii-matching-audience-targeting-platform-reach-85-percent-u-s-175006 (Apr. 28, 2016).

Adobe Corporation, "Managing Anonymous and Authenticated Experiences Across the Customer Lifecycle," https://offers.adobe.com/content/dam/offer-manager/en/na/marketing/Campaign%20PDF's/230209_anonymous_authenticated_experiences_guide_ue.pdf (Aug. 19, 2019).

Requisition by the Examiner in corresponding Canadian Patent Application No. 3,152,810 (dated Mar. 7, 2025).

* cited by examiner

CONNECTING WEB PUBLISHER INVENTORY TO PROGRAMMATIC EXCHANGES WITHOUT THIRD-PARTY COOKIES

BACKGROUND OF THE INVENTION

Third-party cookies are cookies that are set on a browser by a website other than the one that the user is currently accessing at the time that the cookie is set. These may be used by advertisers or ad servers in order to track a user's browsing activities on the Internet to provide targeted advertising, to generate virtual user profiles, or for web analytic purposes. Using third-party cookies, a user may review an item for sale on a first website, and then be served an ad for that exact item or a similar item on a second or third website visited by the user at a later time. Third-party cookies allow the collection of data such as the website that the user visited from which the cookie was generated; subpages visited on the same website; and time spent on the website and its various subpages. In order to function correctly, much of today's online or "programmatic" advertising ecosystem depends upon the use of third-party cookies for user advertising targeting. Although third-party cookies make online advertisements more relevant to users, they have also been the subject of controversy.

The great majority of web browsers provide their users with the option to block third-party cookies. Generally speaking, however, the default setting is to allow third-party cookies, because many websites will not run properly if third-party cookies are blocked. Users therefore must take positive action in order to block third-party cookies, by either changing the browser default setting or purchasing an ad blocker service. Few users, however, take these actions. The Safari browser from Apple, Inc., on the other hand, disables third-party cookies by default. Given the enormous popularity of the Safari browser and Apple products in general, third-party cookies are no longer useful for advertisers on a large percentage of user devices. It is expected that the number of browsers that default to blocking third-party cookies will increase, and thereby make third-party cookies even less useful for advertisers. Firefox, a browser offered by Mozilla, has followed Safari and Google, the maker of the popular Chrome browser, has already announced its plans to stop supporting third-party cookies. Because Safari, Firefox and Chrome together are used for a large percentage of all web browsing, using third-party cookies for targeted advertising and other purposes will soon become impractical. Device identifiers in the mobile (in-app) ecosystem are under similar scrutiny as third-party cookies and standardized advertising identifiers have yet to emerge in environments like Connected TV. Therefore, a system and method for targeting on-line advertisements that does not utilize third-party cookies, while simultaneously providing privacy protection to the users who are targeted with these advertisements while browsing, would be highly desirable.

References mentioned in this background section are not admitted to be prior art with respect to the present invention.

BRIEF SUMMARY OF THE INVENTION

The present invention is directed to a standalone system and method to connect web publishers' inventory to advertising exchanges without the use of third-party cookies.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only.

Figure 1:
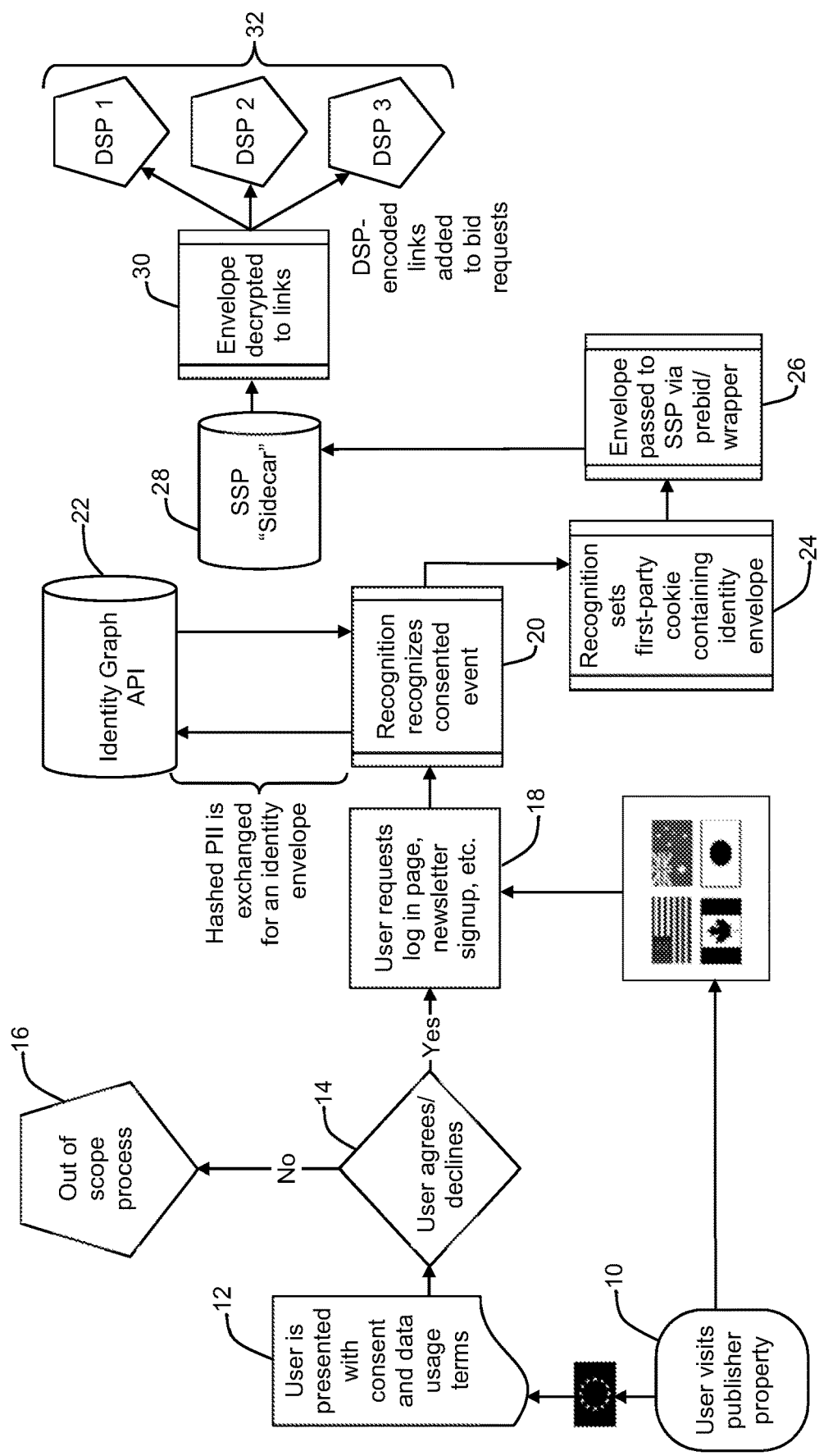
FIG. 1 is a flow diagram depicting at a high level an implementation of the present invention.

A system according to an embodiment of the invention is illustrated in FIG. 1. The process begins with a user visiting a publisher's digital property at step 10. A "publisher digital property" may be any discrete digital asset that contains content deemed desirable by the user, including without limitation news, entertainment, and social media, and may include textual, audio, photographic, or video content. A branch is optionally chosen in processing, depending upon whether the user is a resident of the EU or not. In the case of a user situated in the EU, then the user is presented with appropriate consent and data usage terms at step 12, as called for under the General Data Protection Regulation (GDPR) applicable to EU residents. Optionally, this step may be performed for users in any other region, or for users in all regions. If the user declines in response to the terms presented at step 14, then processing stops at step 16. If the user agrees or if the processing is from a user who is not an EU resident, then processing proceeds to step 18, at which the user sets up a log-in at a log-in page, signs up for a newsletter, etc. This step may include any activity by which the user provides user information to the publisher website. In the typical case, the user provides personally identifiable information (PII) at this point, such as an email address or phone number, which will allow for the deterministic identification of the individual later in the processing.

The user's item or items of PII are then sent to the recognition block at step 20, where the system recognizes the consented authentication event that resulted in the user providing the item of PII. Using the non-limiting example of an email as PII, the email is hashed and then a call is made to an application programming interface (API) at step 22 to access an identity graph. The purpose of this API is to provide a front end to a system that is able to use the hashed PII in order to positively, pseudonymously identify the person to whom the email belongs, and return an encrypted identity "envelope" to the recognition block. An identity graph is a data structure that contains nodes for a large collection of objects, such as consumers in a geographic or geopolitical region. By searching the identity graph for the hashed PII, the corresponding entity representing the person may be identified. The link is an identifier that is uniquely associated with a particular person from within a universe of such persons, such as all such persons in a particular geographic or geopolitical region. The link may be of any form, including, for example, a number or alphanumeric identifier. One such service providing these sorts of links is the IdentityLink service provided by LiveRamp, Inc. of San Francisco, California. The IdentityLink is an identifier that uniquely and persistently is associated with a particular user. In certain implementations, the link may be hashed in a manner that is particular to each publisher. In this manner, publishers will be unable to accumulate and share links in order to surreptitiously defeat the privacy protections afforded to users within this system. The IdentityLink system uses partner encoding (i.e., separate encryption algorithms for each partner) in order to provide this functionality. It may be seen then that an item of PII input by the user at step 18 is transformed to an encrypted link at step 20, which is included in the envelope. The envelope is an encrypted container which contains one or more links along with relevant metadata. The envelope, even when representing identical underlying information, is unique for every request due to the nature of encryption applied. The encryption of the data within the envelope serves to protect the privacy of the user whose web browser has stored the envelope as a first-party cookie.

Once the envelope is returned, the recognition block then sets a first-party cookie or local storage object on that user's browser at step 24. This first-party cookie contains the identity envelope. It should be noted that since this is a first-party link, it is—from the perspective of the browser—being provided by the publisher, not by a third party. The system thus can operate in an environment or on a browser even where third-party links are blocked.

Sometime after setting the first-party cookie, the envelope is read from the user's browser at step 26, and is passed to a supply-side platform (SSP). An SSP is an advertising exchange, contracted by the publisher, used to programmatically sell advertising in an automated fashion. It is used by publishers to help them sell various types of advertisements in an automated fashion. The SSP implements a service provider "sidecar" at step 28. The sidecar is a subsystem for managing the secure decryption and decoding of pseudonymous identifiers used in real-time (programmatic) advertising. It generates platform-encoded links (such as IdentityLink links) at a speed that makes the system workable in a real-time bidding programmatic advertising environment. The sidecar may include permissioning functionality by managing links, periodically check for updates to encoding information, and may periodically report telemetry information. The sidecar accepts securely encrypted payloads, and in response outputs correctly-encoded identifiers for downstream platforms such as a demand-side platform (DSP) at step 30. A DSP is similar to an SSP in function, but is used on the marketing (i.e., the "demand" side) to buy ad impressions from exchanges in an automated bidding fashion.

An output from the sidecar will be encoded IdentityLink identifiers (or other types of links), decrypted from the input envelope according to the permissions afforded to the sidecar and the metadata contained within the envelope. These DSP links are each encoded separately for each demand side platform (DSP) that is a part of the system at step 32, which is another step to ensure the privacy of the users whose data is of interest. Specifically, the purpose for this functionality is to prevent DSPs from surreptitiously sharing links in order to collude with each other and thereby defeat the inherent privacy protection afforded to users by this system. Once the DSP-encoded IdentityLink identifiers are passed out to the various DSPs, then programmatic advertising and real-time bidding for publisher inventory to advertisers or their agencies may proceed in a normal manner without the need for third-party cookies or other device identifiers.

Figure 2:
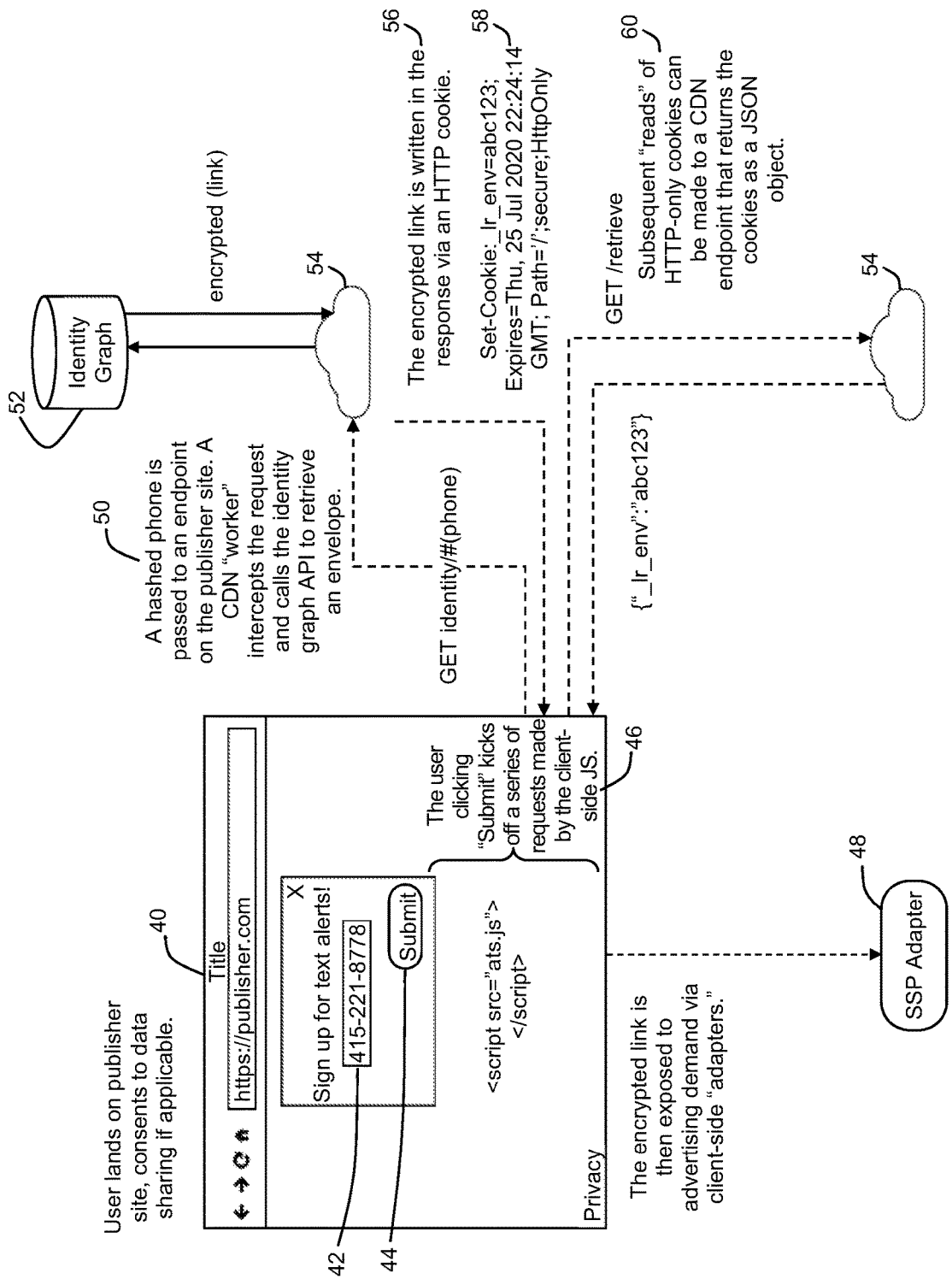
FIG. 2 is a more detailed flow diagram depicting the process of FIG. 1.

The operation of the invention may also be described with respect to the flow diagram of FIG. 2. A user accesses a publisher website using web browser 40. During the course of utilizing the website for information, commerce, or other purposes, the user is presented with the opportunity to provide an item of Hat box 42. This may be, for example, in order to receive updates on products, alerts about offers, and the like. The item of PII as illustrated in FIG. 2 is a telephone number, but any such information may be submitted in various implementations. The user may, in certain implementations, be presented with a "submit" button 44 in order to transfer the item of PII to the publisher. When the user clicks the submit button, this begins a series of requests made by a client-side process 46, which may in certain implementations be implemented in the JavaScript programming language. The item of PII is hashed on the device in order to protect privacy, and is passed to an endpoint on the publisher site at step 50. A content delivery network (CDN) "worker" 54 accepts the request, and calls the identity graph API 52 to retrieve an envelope corresponding to the item of PII. A CDN, such as are provided by Cloudflare, Inc. of San Francisco, California, is a geographically distributed group of servers that work together to provide extremely fast delivery of Internet content, such as for loading HTML content, JavaScript files, images, and videos. A CDN does not host content, but may cache the content and thus works in conjunction with hosting servers to increase performance speed. The CDN is thus used in this implementation of the invention for intercepting the request and responding quickly, but in other implementations of the invention other hardware configurations may be employed. Regardless, the encrypted link that is returned by the CDN worker 54 or other hardware device is then written in the response via an HTTP cookie at step 56. Step 58 shows example code for setting the first-party cookie on the user's browser.

Subsequent to the above steps, at step 60 the first-party cookie is read. This may occur as the user travels between websites using his or her browser. Another CDN worker 54 is used here to read the HTTP-only cookie and return the cookie as a JavaScript Object Notation (JSON) object. JSON is a data-interchange format based on JavaScript and commonly used for communication of data on the Internet. In alternative implementations, other formats may be used, such as but not limited to extensible Markup Language (XML).

The present invention, in the various process implementations as described herein, offer a number of advantages. In certain implementations the process is based on a standalone JavaScript file, and thus no external dependencies, although the invention is not limited to the use of JavaScript and alternative technologies may be employed in alternative implementations. It provides the capability of accurately capturing common PII entries, such as but not limited to telephone numbers and email addresses. In certain implementations, it may include the functionality to apply downcase (i.e., make each character in a string lowercase) and remove whitespace (such as spaces) from plaintext emails before hashing and requesting the envelope with the link via the API. Optionally, in certain configurations the process may accommodate less common PII entry fields. Because of the speed at which the process operates and the fact that it functions in real time, it has no user-noticeable delay, and thus has no impact to the user experience at a publisher website. In various implementations the invention avoids problems with third-party cookies by writing envelopes to persistent first-party storage associated with the user browser, such as in a flash memory or hard drive. In certain configurations, the invention is easily interfaced with other prebid.js adapters used in the programmatic advertising ecosystem, and also may easily interface with various third-party systems, such as the Privacy Manager JavaScript API for the consent management platform (CMP) from LiveRamp, Inc. of San Francisco, California. Further, in certain embodiments the invention may present a customizable modal to request the user's email or other PII and can be configured by passing a configuration object at runtime.

Although the invention has been described with respect to applications where cookie caches are used for storing the link envelope, the invention is not so limited. In other implementations, the invention may be applied in channels where hardware device identifiers are available to the publisher, such as is presently the case with respect to mobile devices including smartphones. The invention in other implementations may also be applied in channels where device identity does not exist at all or is imperfect, such as an Internet Protocol (IP) address on an addressable television or television set-top box.

A more detailed description of software components of implementations of the present invention may now be provided. In an embodiment, the invention is implemented as a client-side solution for publishers that detects email entries at a website, including but not limited to log-in interactions and offers to send updates to a user by email. The publisher uses the JavaScript library provided as part of the solution, and is required to instantiate it with a configuration object so that the provider may recognize the instantiation. It may be included in the source HTML header as a self-hosted JavaScript file or served directly. With the library name as ats.js, a self-hosted script could look like this: <script src="/public/javascript/ats.js"></script>. This may be included just before the closing </body> tag to ensure that the page is fully rendered and ready for user interaction. In the case of high-latency pages, ats.js may be added to the <head>. To start the library, a script tag as presented below may be used:

```
<script>
    var atsScript = document.createElement('script');
    atsScript.onload = function( ) {
        window.ats.start({
            "placementID": REPLACE_ME,
            "storageType": "localStorage",
            "detectionType": "scrape",
            "cssSelectors": [
                "input[type=text]",
                "input[type=email]"
            ],
            "logging": "error"
        });
    };
    atsScript.src = 'https://ats.rlcdn.com/ats.js';
    document.body.appendChild(atsScript);
</script>
```

The library will manage detection (unless an identified is directly passed), identity resolution, and persistence. Demand partners are then able to retrieve the link envelope from its storage location, either via a direct JavaScript call or through a prebid.js userID module. The publisher is provided with a JavaScript library and documentation information in order to implement the solution from the publisher side. Specifically, the publisher team pulls down the ats.js library and the standard prebid.js core library, along with proprietary pre-bid adapters that support identity envelopes. This system, once installed, receives an email address (or, in alternative embodiments, other PII) as an input from the user through the publisher site. Suppose now that a user accesses the publisher website for desired news or other publisher content. The user navigates to the appropriate webpage using the Safari browser on his or her iPhone device, in this example. The user is presented with a request to allow data sharing, and responds affirmatively. The user then is presented with the desired content. After reading, a modal slides down across the screen, asking the user for his or her email address in order to receive content updates directly in his or her email inbox. The user, who desires these updates, agrees and returns to the publisher home page. The publisher user then employs the identity envelopes in a general programmatic advertising solution.

The solution provider provides publishers with a free code that is placed in the header of the publisher's website. When a user's identity is provided to the site, the provider's API translates PII (such as email, etc.) to an identity token (an envelope containing a link) and stores it in a first-party cookie context on the user's browser. Upon page load or subsequent page visit, the header bidder reads the link in the envelope from the first-party cookie and passes this to SSPs. Each SSP then passes the link envelope to the provider's "sidecar" (as shown in FIG. 1) to translate to the DSP the encoded links. The DSP-specific encoded links are passed to the DSPs in the programmatic advertising bid request, with other information about the inventory. The DSP is then able to make optimally informed bids with a link tied to both first-party and third-party data.

As may be seen, the system and method provides a JavaScript library that publishers may readily incorporate into their properties. While the code should not execute until consent has been properly collected as required by applicable law, the code should execute as soon as the page can be interacted with by the user. The library may reference a common set of cascading style sheets (CSS) selectors that relate to "typical" locations of identifiers. For example, input[type=text]. A publisher may incorporate additional CSS selectors, either in the library file itself or in an additional selector-only file. Using configured CSS selectors, the system may watch for any interesting on "submit" events that contain valid email addresses as defined by a typical email regular expression (regex), e.g., /^[a-zA-Z0-9.!#$%&'*+/=?^_`{|}~-]+@[a-zA-Z0-9-]+(?:\.[a-zA-Z0-9-]+)*$/. Upon recognition of a valid email submission event, the email is hashed (such as using the SHA1 algorithm) and a network call is made to an API from the system's provider that will accept the hash and return an envelope in a JSON payload, such as this:

{"envelope":"AhT2iHFFSriRpMW1oRuKYGcT0DJiLzpyAr3z4SnsCWa4-ae2DqE8ru2fdZjmtLC0Tb8-3g"}.

The envelope is then written into client-side, first-party storage along with a timestamp at which the value was written or updated. The prebid.js adapters take over at this point, reading the envelope and making it available with the ad exchanges in the programmatic advertising ecosystem.

Configuration options allow the publisher to instruct how and when to transform PII into secure, encrypted link envelopes. A placementID should be used in a configuration object, in order to identify to the provider the particular instantiation of the solution and associate that with a particular publisher. The ats.js has two basic modes of operation: direct and detect. In direct mode, the publisher provides the identifier directly to the ATS library. If the publisher already has user login information, the publisher may ensure that it is usable by demand by including it directly in its configuration. If the publisher knows that users will provide an identifier on the property, but isn't able to provide it supply-side (such as, for example, if there is a newsletter signup provided by a Marketo or Mailchimp widget), then the provider can use DOM or URL-driven detection methods. Using direct, the publisher may pass plaintext email addresses as follows (the provider here being LiveRamp, Inc.):

```
{
  "placementID": 9999,
  "email": "imeyers@liveramp.com" }
Otherwise, one or more email hashes can be passed as follows:
{
  "placementID": 9999,
  "emailHashes": [
"b364fe946d9982c6c547d5637645f9c3dd60ca2aa174e551718509d5dee6 6ab7", "b2c0928035d5f521a880381dc7ec85df7b7e06b3",
    "4466aba660dd65e279fb8700f7ff1cb9"
  ]
}
```

In a preferred embodiment, the publisher passes either a plaintext email address or multiple hash types to ATS in order to ensure the best possible identity resolution (and therefore matches to users that the advertisers wish to reach). Before the email hashes are passed, the publisher should preferably ensure that the emails are validated against a regular expression, remove whitespaces, and downcase all letters in the address. If detect is used, then the solution can be configured to accept one or more standard CSS selectors that instruct it where to watch for identifiers, as follows:

```
{
  "placementID": 9999,
  "cssSelectors: [
  "newsletterSignup"
  ]
}
```

Alternatively, the publisher can instruct the solution to watch for an identifier in a URL parameter. For example, if a user clocks through email notifications and lands on https:///example.com/ alerts?email_trigger=imeyers@liveramp.com, then the publisher can configure the solution to check values in the email_trigger parameter. The URL value should be passed under the detectiontype attribute. URL detection may be as follows:

```
{
  "placementID": 9999,
  "detectionType": "url",
  "urlParameter": "email_trigger"
}
```

In addition, there are a number of advanced configuration options that are expected to be used less commonly. By default, the envelope (along with a generation timestamp and version information) is written to a first-party cookie. The publisher can alternatively instruct the solution to write into a local storage object by changing the storageType attribute:

```
{
  "placementID": 9999,
  "storageType": "localStorage", "cssSelectors": [
    "input[type=email]"
  ]
}
```

If the publisher wishes to run ATS on specific browsers, those may be identified in the browsers attribute, as follows:

```
{
  "placementID": 9999, "cssSelectors": [
    "#newsletterSignup" ],
  "browsers": [
    "safari"
  ]
}
```

By default, the solution runs utilizing the library that is first loaded. Alternatively, a detection interval may be specified. This is useful, for example, if the publisher expects an asynchronous process to populate the user's email address in a DOM element. An example for detection every ten seconds may be as follows:

```
{
  "placementID": 9999,
  "cssSelectors": [
  ],
  "detectionInterval: 10000
}
```

If it is desired to limit the pages on which the solution will attempt to run, urlRegex may be used in the configuration:

```
{
  "placementID": 9999, "cssSelectors": [
    "input[type=email]" ],
  "urlRegex": "login"
}
```

By default, the solution does not log any library events, but it may be useful to view more verbose logs, especially during development:

```
{
  "placementID": 9999, "cssSelectors": [
    "#newsletterSignup" ],
  "logging": "debug"
}
```

Other potential values are ["Info", "warn", "error"].

Typically, the only ats.js function that will be called is ats.start(config). This function should be placed into its own HTML <script> tag and called with the publisher's configuration object just after the <script> tag for ats.js. Other possible function calls may be ats.retrieveEnvelope(callback), which fetches an envelope from configured storage, with the callback function being optional. If the function is called without a callback, a promise will be returned. If the function is called with callback, an envelope value will be returned. Another possible function is ats.triggerDetection( ). This function will scan for DOM elements with the CSS selectors specified in the publisher's configuration.

In certain implementations, the pre-existing, open source prebid.js is used with ats.js, as ats.js is optimized to plug into prebid.js. Once a properly configured prebid.js file is down-loaded, the publisher should update pbjs.setConfig to pass the required information to the link user ID module. A configuration for prebid.js is shown below:

```
pbjs.setConfig({
    userSync: {
        userIds: [{
            name: 'identityLink',
            params: {
                pid: '9999' // Set your real identityLink placement ID here
            },
            storage: {
                type: 'cookie',
                name: 'idl_env',
                expires: 1
            }
        }],
        syncDelay: 5000
    }
}
```

For the API underlying the JavaScript library accessed directly, the query parameters for the API call include the pid (partner ID number); it (identifier type of email, i.e., hashed email, hashed phone number, etc.); iv (a hash of the raw email); ct (indicating the type of consent passed to the API, e.g., whether or not it is a TCF v.1.1 or v2 compatible consent string as required under the GDPR); and cv (the relevant consent string value). Hashing methods may include MD5, SHA1, and SHA256, as examples. Preferably, all spaces, tabs, and other empty characters are removed from the plaintext email before processing, and capital letters are all converted to lowercase. "Fake" emails are identified and dropped. For phone numbers, formatting should preferably be removed before processing. The response from the API call if successful with be a JSON object with a simple key/value containing the identity envelope, such as

```
{"envelope":"Ao42jiiUNWfvloyXY887EBn801otRTWYnklvjCtw9REF_TMo
MWLkeUvzVmQVZG1q"}.
```

If the user is opted out, then there will be a different response code with no content.

Although in the implementations described above the invention does not require the use of third-party cookies, in alternative implementations such functionality can be provided. In order to enhance addressability, for example, alternative implementations may support dropping a standard image match pixel. In this case, the publisher requests a pixel identifier from the service provider. Once the pixel identifier is obtained, this may be provided into the ats.js configuration with example code provided below:

```
{
    "placementID": 9999,
    "cssSelectors": [
        "input[type=text]"
    ],
    "pixelID": 12345
}
```

This code will drop a script tag just before the closing </body> tag and attempt to set a service provider third-party cookie in a conventional manner.

In certain implementations, the invention may be integrated with social media log-in information. Social log-ins can be powerful tools to register users with minimal friction and high confidence in the validity of the provided infor-mation. For example, consider the case where integration is desired with the Facebook platform. The publisher is likely using the Facebook JavaScript SDK, which allows the publisher to obtain user emails from Facebook APIs for use with ats.js. The publisher may implement a "log in with Facebook" button, using html code as in the following example:

<a onclock-"onLogin( )">Login with Facebook</a>

In that case, the JavaScript code for the onLogin function might be as follows:

```
function onLogin( ) {
    FB.login(function(response) {
        if (response.authResponse) {
            window.FB.api('/me?fields=email', function(response)
            {
                callATS(response.email);
            });
        } else {
            console.log('not logged in...');
        }
    }, {scope: 'email'})
}
```

As another example, consider a publisher using Google sign in to authenticate users. In this case, the publisher may need only to modify its onSignIn function to call the provider's system using the user's email address, as shown in the exemplary JavaScript code that follows:

```
function onSignIn(googleUser) {
    var profile = googleUser.getBasicProfile( );
    var email = profile.getmail( ));
    callATS(email);
}
```

In various implementations the invention may also be integrated with website tag managers, such as the Google Tag Manager. Using the Google Tag Manager as currently implemented, the publisher would first navigate to url https://tagmanager.google.com, and then click "New Tag." The tag name "Untitled Tag" is then changed to something to identify the tag being created, such as "ATS JavaScript." The user then clicks in the Tag Configuration section, and under "Choose Tag Type" clicks "Custom HTML Tag." The exemplary HTML code below may be used, with the publisher replacing its own placement ID for the REPLACE_ME value.

```
<script>
    var atsScript = document.createElement('script');
    atsScript.onload = function( ) {
        window.ats.start({
            "placementID": REPLACE_ME,
            "storageType": "localStorage",
            "detectionType": "scrape",
            "cssSelectors": [
                "input[type=text]",
                "input[type=email]"
            ],
            "logging": "error"
        });
    };
```

```
atsScript.src = 'https://ats.rlcdn.com/ats.js';
document.body.appendChild(atsScript);
</script>
```

The publisher then clicks into "Triggering" and selects the trigger it would like to connect the ats.js execution to. In one example, the trigger can be configured to fire on all pages. The publisher then saves changes, clicks "Submit," and then "Publisher," optionally adding a version change note.

In certain implementations, the invention may support the use of a custom identifier (custom ID) instead of typical identifiers such as hashed email addresses and telephone numbers. A mapping file may be sent to the service provider in order to implement this functionality. In an example, the file should contain the publisher company name, the type of upload and the current date in ISO 8601 format separated by underscores. An example would be "IansCompany_AKP_2020-03-01.tsv". The contents of the file in this example are two tab-separated columns, titled "CID" and "Email Address." The first column contains the userIDs that the publisher will input to the ats.js system. The second column contains a SHA-256 hashed email address. The email address should be downcases and whitespace removed prior to hashing to ensure an accurate result. The file may be sent to the provider over SFTP.

Once the provider has confirmed successful ingestion of the publisher's first mapping file, the publisher will then configure ats.js for the newly-created custom identifier. The provider will provide the publisher with an accountID, which is to be included in the configuration. A regular expression should also be included for the identifier in customerIDRegex. The regular expression enables ats.js to validate that identifiers match an expected pattern. Similar to using ats.js with raw identifiers, the publisher can either pass the identifier directly in the configuration (as the customerID) parameter, or let ats.js operate in detect mode. If detection is used, then the publisher should ensure that "detectionSubject": "customerIdentifier" is passed alongside any other required attributes such as detectionType. A sample configuration custom ID detection follows:

```
{
    "logging": "debug",
    "placementID": 9999,
    "detectionType": "url",
    "urlParameter": "customerid",
    "detectionSubject": "customerIdentifier",
    "customerIDRegex": "[0-9a-f]{32}\Z",
    "accountID": "123456",
    "customerID": "0d755934-693e-42c7-b04a-761a9c82df60"
}
```

A sample configuration for custom ID direct operation follows:

```
{
    "logging": "debug",
    "placementID": 9999,
    "customerIDRegex": "[0-9a-f]{32}\Z",
    "accountID": "123456",
    "customerID": "0d755934-693e-42c7-b04a-761a9c82df60"
}
```

In certain implementations, the invention may have the ability to accept emails passed in the URL from an email newsletter product. Generally speaking, it is preferable to leverage direct logins from users, because that approach provides the best transparency into what data is being processed on the users' behalf and also ensures that the publisher has the correct identity, as emails can be forwarded to individuals other than the original recipient. But utilizing emails from an email newsletter product may, however, be useful for publishers who already have a large pool of identifier users in their email service provider (ESP). To enable ats.js to leverage these identifiers, the publisher should modify its standard newsletters or transactional emails to pass an identifier when users click through to visit the site. The publisher will either add a new link (or modify an existing link) to add an additional query parameter and then add [email] to represent a dynamically-populated representation of the user's email address. One example URL could be: https://authenticated-traffic-solution.com?user_id=[email]. Next, the publisher configures ats.js to detect and resolve email addresses passed through its campaign monitor. The example JavaScript below may be used, modified to use the publisher's actual placement ID and the query parameter used when setting up the link:

```
{
    "placementID": 9999,
    "storageType": "localStorage",
    "detectionType": "url",
    "detectionSubject": "email",
    "logging": error",
    "urlParameter": "user_id"
}
```

In the specific example where mailchimp is used for email campaigns, the additional query parameter adds *|EMAIL|* to represent a dynamically-populated representation of the user's email address: An example url would be: https://authenticated-traffic-solution.com?user_id=|email|*. The publisher would then click "insert" to update the link. In previews, the publisher will see the email macro populated with <<Test Email Address>>. In production, this field will be populated with the recipient's email. The publisher then configures ats.js to detect and resolve the email addresses passed through mailchimp; the example configuration below may be used:

```
{
    "placementID": 9999,
    "storageType": "localStorage",
    "detectionType": "url",
    "detectionSubject": "email",
    "logging": error",
    "urlParameter": "user_id"
}
```

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and sub-combinations possible of the group are intended to be individually included in the disclosure. When a range is mentioned herein, the disclosure is specifically intended to include all points in that range and all sub-ranges within that range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, which will be limited only by the claims in a subsequent nonprovisional patent application.

The invention claimed is:

1. A system for connecting publisher inventory to exchanges in a distributed cloud computing network, comprising:
   a. An identity graph data structure stored in a hardware database connected to the distributed cloud computing network, wherein the identity graph comprises a plurality of nodes each comprising data pertaining to a person and a link uniquely associated with such person, wherein the identity graph is configured to receive an item of personally identifiable information (PII), search the plurality of nodes for a person matching the item of PII, and return the link corresponding to the person matching the item of PII;

b. a recognition sub-system implemented on one or more hardware processors in one or more computer systems in the distributed cloud computing network, wherein the recognition sub-system is configured to:
  i. receive the item of PII from a publisher computer server;
  ii. send the item of PII to the identity graph in the database;
  iii. receive back from the identity graph the link for the person corresponding to the item of PII and encode the link to create an encoded link;
  iv. create an envelope containing the encoded link and a set of metadata comprising encryption permissions;
  v. create a first-party cookie comprising the envelope; and
  vi. send the envelope to the publisher computer server; and
c. a sidecar sub-system implemented on one or more hardware processors in one or more of the computer systems in the distributed cloud computing network as part of a supply-side platform (SSP), wherein the sidecar sub-system is configured to receive the envelope containing the encoded link from the first-party cookie, decode the link, and create and output a platform-encoded link from the decoded link to a plurality of demand-side platforms (DSPs), wherein the platform-encoded link is encrypted by the sidecar sub-system according to the encryption permissions in the set of metadata in the envelope such that one and only one of the plurality of DSPs can decrypt the platform-encoded link, wherein the sidecar sub-system is further configured to perform all of its functions at a speed that facilitates operation within a real-time bidding programmatic advertising environment.

2. The system of claim 1, wherein the recognition sub-system is further configured to hash the item of PII before sending the item of PII to the identity graph.

3. The system of claim 2, wherein the recognition sub-system is further configured to set the first-party cookie on a user browser.

4. The system of claim 3, wherein the sidecar is further configured to decrypt the link in the envelope.

5. The system of claim 4, wherein the sidecar sub-system operates in real time.

6. The system of claim 1, wherein the recognition sub-system is further configured to encrypt the envelope.

7. The system of claim 3, further comprising a publisher web server comprising a publisher digital property.

8. The system of claim 7, further comprising a user computing device, wherein the user computing device comprises a digital storage area configured to receive a publisher user data set.

9. The system of claim 8, wherein the publisher user data set comprises a first-party cookie.

10. A method for connecting publisher inventory to exchanges, comprising the steps of:
  a. receiving an item of PII concerning a person;
  b. searching an identity graph on a hardware database for a node in the identity graph matching the item of PII;
  c. returning from the matched node a link uniquely associated with the person;
  d. setting a publisher user data item on a device operated by the person, wherein the publisher user data item is a first-party cookie comprising an envelope comprising an encoded link and a set of metadata comprising encryption permissions;
  e. sometime after setting the publisher user data item on the device, reading the first-party cookie to retrieve the envelope and the set of metadata;
  f. decoding the encoded link to create a decoded link, and generating an encrypted link from the decoded link, wherein the encrypted link is encrypted in real time by a sidecar sub-system of a supply-side platform (SSP) according to the encryption permissions in the set of metadata in the envelope at a speed that facilitates operation within a real-time bidding programmatic advertising environment; and
  g. sending the encrypted link to a plurality of demand-side platforms (DSPs), wherein the encryption permissions in the set of metadata are keyed to a particular one of the plurality of DSPs to which the encrypted link is sent such that one and only one of the plurality of DSPs can decrypt the encrypted link.

11. The method of claim 10, further comprising the step of hashing the item of PII before searching the identity graph for the node in the identity graph matching the item of PII.

12. The method of claim 10, further comprising the step of encrypting the envelope.

13. The method of claim 10, further comprising the step of encoding the link differently for each DSP of the plurality of DSPs to which the link is sent.

14. The method of claim 10, wherein the step of reading the envelope to retrieve the link is performed in real time.

15. The method of claim 14, further comprising the step of presenting a first digital property to the person at the device in response to a first request from the device.

16. The method of claim 14, further comprising the step of receiving the item of PII from the person through the device at the first digital property.

17. The method of claim 16, further comprising the step of requesting user consent prior to the step of receiving the item of PII from the person through the device at the first digital property.

18. The method of claim 17, wherein the item of PII is either an email address or a telephone number.

19. The method of claim 17, wherein the item of PII is a custom identifier comprising individually identifying information.

20. The method of claim 16, further comprising the step of presenting a second digital property to the person at the device in response to a second request from the device, wherein the first digital property is different from the second digital property.

21. The method of claim 19, further comprising the step of serving a digital advertisement to the device of the person while visiting the second digital property, wherein the digital advertisement is selected from a plurality of potential digital advertisements based on an identity of the person.

22. A method for connecting publisher inventory to exchanges, comprising the steps of:
  a. displaying a user interface at a consumer device comprising an input area for an item of personally identifiable information (PII);
  b. receiving the item of PII from the user interface;
  c. at a sidecar sub-system of a supply-side platform (SSP), encrypting the item of PII such that one and only one of a plurality of demand-side platforms (DSPs) can decrypt the encrypted item of PII, wherein the encrypting the item step is performed at a speed that facilitates operation within a real-time bidding programmatic advertising environment;

d. setting a first-party cookie on the consumer device, wherein the first-party cookie comprises the encrypted item of PII from the sidecar sub-system;
e. subsequent to setting the first-party cookie on the consumer device, reading the first-party cookie at a publisher server;
f. on a hardware database, searching an identity graph comprising a plurality of nodes, and identifying one of the plurality of nodes in the identity graph matching the encrypted item of PII in the first-party cookie;
g. selecting a digital advertisement from a plurality of potential digital advertisements based on a datum in the one of the plurality of nodes in the identity graph matching the link in the first-party cookie;
h. displaying the digital advertisement at the consumer device; and
i. sending the encrypted item of PII to each of the plurality of DSPs.

23. The method of claim 22, wherein the step of setting a first-party cookie on the consumer device is performed in real time.

24. The method of claim 22, wherein the item of PII is an email address.

25. A system for connecting publisher inventory to exchanges in a distributed computing environment, comprising:
   a. a publisher server configured to provide a user interface on a digital property with an entry area for an item of unencrypted personally identifiable information (PII) and, upon receipt of the item of unencrypted PII, encrypt the item of unencrypted PII to create an item of encrypted PII;
   b. an identity graph stored on a physical database within the distributed computing environment, wherein the identity graph comprises a plurality of nodes each comprising data pertaining to a person, wherein the identity graph is configured to receive the item of encrypted PII and search the plurality of nodes for a node matching the item of encrypted PII;
   c. a recognition sub-system implemented on a hardware server in communication with the physical database within the distributed computing environment, wherein the recognition sub-system is configured to:
      i. receive the item of encrypted PII from the publisher server;
      ii. send the item of encrypted PII to the identity graph;
      iii. receive back from the identity graph a datum from the node matching the item of encrypted PII; and
      iv. create a first-party cookie comprising the item of encrypted PII; and
   d. a sidecar sub-system configured to receive an envelope containing an encoded link from the first-party cookie, decode and then encrypt the encoded link to create an encrypted link, and output the encrypted link to a plurality of demand-side platforms (DSPs) at a speed that facilitates operation within a real-time bidding programmatic advertising environment, wherein the encrypted link is encrypted by the sidecar sub-system according to a set of encryption permissions in a set of metadata in the envelope such that the encrypted link is encrypted specifically to be read only by a particular one of the plurality of DSPs.

26. The system of claim 25, wherein the publisher server is further configured to set the first-party cookie on a client device.

27. The system of claim 26, wherein the publisher server is further configured to display a digital property on the client device.

28. The system of claim 27, wherein the publisher server is further configured to provide a user interface on the digital property with an entry area for an item of unencrypted PII and, upon receipt of the item of unencrypted PII, encrypt the item of unencrypted PII to create the item of encrypted PII.

29. The system of claim 28, wherein the item of unencrypted PII is an email address.

* * * * *